(12) United States Patent
Haack et al.

(10) Patent No.: US 11,396,358 B2
(45) Date of Patent: Jul. 26, 2022

(54) DOOR SYSTEM FOR AN AIRCRAFT AND AIRCRAFT

(71) Applicant: Premium Aerotec GmbH, Augsburg (DE)

(72) Inventors: Cord Haack, Augsburg (DE); Carsten Paul, Augsburg (DE); Bernhard Höger, Augsburg (DE)

(73) Assignee: Premium Aerotec GmbH

( * ) Notice: Subject to any disclaimer, the term of this patent is extended or adjusted under 35 U.S.C. 154(b) by 0 days.

(21) Appl. No.: 17/175,122

(22) Filed: Feb. 12, 2021

(65) Prior Publication Data

US 2021/0253218 A1      Aug. 19, 2021

(30) Foreign Application Priority Data

Feb. 13, 2020 (DE) .................... 10 2020 201 779.4

(51) Int. Cl.
*B64C 1/14* (2006.01)

(52) U.S. Cl.
CPC .......... *B64C 1/1461* (2013.01); *B64C 1/1423* (2013.01)

(58) Field of Classification Search
CPC ............................ B64C 1/1461; B64C 1/1423
See application file for complete search history.

(56) References Cited

U.S. PATENT DOCUMENTS

| | | | |
|---|---|---|---|
| 6,378,806 B1 | 4/2002 | Erben | |
| 8,511,610 B2 * | 8/2013 | Depeige | B64C 1/14 244/129.4 |

(Continued)

FOREIGN PATENT DOCUMENTS

| | | |
|---|---|---|
| DE | 19906033 A1 | 8/2000 |
| DE | 19923441 C1 | 11/2000 |

(Continued)

OTHER PUBLICATIONS

Extended European Search Report including Written Opinion for EP21156458.8 dated Jun. 22, 2021; 9 pages.

(Continued)

*Primary Examiner* — Brian M O'Hara
*Assistant Examiner* — Michael B. Kreiner
(74) *Attorney, Agent, or Firm* — Lerner, David, Littenberg, Krumholz & Mentlik, LLP (57) ABSTRACT

A door system for an aircraft includes a door frame defining a door opening with a first perimeter strut and a second perimeter strut spaced apart from the first perimeter strut, at least one first frame stopper attached to the first perimeter strut and at least one second frame stopper attached to the second perimeter strut. The frame stoppers each comprise a first contact portion projecting into the door opening and having a first toothing. The first toothings are each formed on an inner surface of the first abutment portion. Further, the door system comprises a door mounted movably relative to the door frame and disposed in the door opening in a closed state, and a number of door stoppers corresponding to the number of frame stoppers disposed on opposite sides of the door and connected to the door, each door stopper having a second abutment portion. The second abutment portion comprises a second toothing formed complementary to the first toothing. The first toothing of a respective frame stopper and the second toothing of a respective door stopper engage in each other in the closed state of the door.

15 Claims, 4 Drawing Sheets

(56) References Cited

U.S. PATENT DOCUMENTS

| | | | | |
|---|---|---|---|---|
| 8,800,927 | B2* | 8/2014 | Schimmler | B64C 1/1423 244/129.5 |
| 2004/0262454 | A1* | 12/2004 | Lehmbecker | B64C 1/1407 244/129.5 |
| 2010/0276543 | A1 | 11/2010 | Schimmler et al. | |
| 2014/0224933 | A1* | 8/2014 | Paul | B64C 1/06 244/129.1 |
| 2018/0304982 | A1 | 10/2018 | Curry et al. | |

FOREIGN PATENT DOCUMENTS

| | | |
|---|---|---|
| DE | 20219786 U1 | 3/2003 |
| DE | 102004046799 B4 | 2/2007 |
| DE | 102009056533 A1 | 6/2011 |
| WO | 9825817 A1 | 6/1998 |

OTHER PUBLICATIONS

Search Report from German Office Action for Application No. 102020201779.4 dated Sep. 11, 2020; 1 page.

* cited by examiner

DOOR SYSTEM FOR AN AIRCRAFT AND AIRCRAFT

The present invention relates to a door system for an aircraft and to an aircraft, specifically an airplane, such as a passenger airplane.

In the fuselage of an aircraft, doors are provided for passengers and onboard staff as well as for loading and unloading the aircraft. The doors are usually mounted in a frame, which is connected to the fuselage structure or forms part of the fuselage structure. In a closed state of the door, the door is located in a door opening defined by the frame. Stops or stop elements are typically provided on a peripheral edge of the door, which in the closed state of the door abut stops or stop elements provided on the frame. As the altitude of the aircraft increases, the ambient pressure decreases, as a result of which the pressure inside the fuselage is usually significantly higher than that in the surrounding area of the aircraft. The forces acting on the door as a result of the pressure difference are transmitted from the door to the frame via the stops of the door and the stops of the frame.

Typically, in the closed state, the door is floatingly mounted in the door opening by the stops, so that forces can only be transmitted from the door to the door frame in a radial direction extending perpendicular to the door face, but not in the door face in a longitudinal direction or a perimeter direction. These loads are typically transmitted around the door opening via the door frame by means of solid stiffening structures.

In order to reduce additional required stiffening of the door frame, US 2018/0304982 A1 describes a door system with a door and a door frame, wherein, in a closed state of the door, the door and the door frame are coupled to each other via connecting devices in the form of male-female connectors, so that loads can be transferred in the longitudinal direction from the frame to the door via the connecting devices.

It is an objective of the present invention to provide improved solutions for aircraft door assemblies.

This objective is solved by the objects of the independent claims, respectively.

According to a first aspect of the invention, a door system for an aircraft is provided. The door system comprises a door frame defining a door opening, having a first perimeter strut extending in a perimeter direction and a second perimeter strut extending in the perimeter direction and arranged spaced apart from the first perimeter strut with respect to a longitudinal direction extending transversely to the perimeter direction, at least one first frame stopper attached to the first perimeter strut and at least one second frame stopper attached to the second perimeter strut, wherein the frame stoppers each comprise a first abutment portion projecting into the door opening and having a first toothing, the first toothing each being formed on an inner surface of the first abutment portion which extends perpendicularly to a radial direction extending transversely to the longitudinal direction and transversely to the perimeter direction. The door system further comprises a door mounted movable relative to the door frame, which in a closed state is disposed in the door opening, and a number of door stoppers corresponding to the number of frame stoppers disposed on opposite sides of the door and connected to the door, each door stopper having a second abutment portion, wherein the second abutment portion has a second teething formed complementary to the first teething, and wherein the first teething of a respective frame stopper and the second teething of a respective door stopper engage with each other in the closed condition of the door.

According to a second aspect of the invention, an aircraft is provided. The aircraft has a fuselage extending along a longitudinal fuselage axis defining an interior space, and a door system according to the first aspect of the invention. The door frame of the door system is connected to the fuselage such that the longitudinal direction extends along and the radial direction extends perpendicular to the fuselage longitudinal axis.

One idea underlying the invention is to implement the door of an aircraft as a load-bearing structure so that forces acting in a perimeter direction and in a longitudinal direction of the fuselage or on the door frame can be transmitted through the door frame and the door. To transmit such loads between the door frame and the door, frame stoppers or frame-side stops are provided on the door frame and door stoppers or door-side stops are provided on the door, which, in a closed state of the door, abut against each other and which each have a toothing. The toothing of the frame-side stops is formed on an inner surface of the respective stop, which extends perpendicularly to a radial direction running transversely to the longitudinal axis of the fuselage or to the longitudinal direction, or whose surface normal points in the radial direction. The inner surface faces the interior of the fuselage. In the closed state of the door, in which the door is disposed in a door opening defined by the frame and closes it, the toothing of a respective door-side stop engages in the toothing of a respective frame-side stop, whereby a form-locked join is formed between the stops with respect to the longitudinal direction and the perimeter direction. Due to the alignment of the inner surfaces of the frame stoppers, the door stoppers of the door are pressed against the toothing of the frame stoppers in the radial direction by the pressure difference between the interior of the fuselage and the environment, which increases with increasing flight altitude.

One of the advantages of the invention is that the door-side stops and the frame-side stops, or the door stoppers and the frame stoppers, each have complementary toothing elements which engage with one another when the door is closed. Since a toothing comprises a plurality of individual toothed elements, the load on each individual toothed element can be kept relatively small, which enables a weight-reduced design for a given mechanical load. Furthermore, redundancy of the load-transmitting elements is thereby realized within the respective door stopper and within the respective frame stopper, so that the probability of stopper failure is reduced. Consequently, the number of stoppers or stops can also be reduced, which further reduces weight.

Advantageous embodiments and further designs result from the dependent claims referring to the independent claims in connection with the description.

According to some embodiments of the door system, it may be provided that the first and the second frame stoppers are arranged at the same level or height with respect to the perimeter direction. Accordingly, the door may also have a first door stopper for engagement with the first frame stopper on a first vertical side facing the first perimeter strut when the door is in the closed state, and a second door stopper for engagement with the second frame stopper on a second vertical side facing the second perimeter strut when the door is in the closed state. In this way, a load can be passed through in the longitudinal direction in the shortest possible way, whereby the load on the door is advantageously reduced.

According to some embodiments, two upper first frame stoppers may each be arranged in an upper region of the first perimeter strut with respect to the perimeter direction, and two upper second frame stoppers may each be arranged in an upper region of the second perimeter strut with respect to the perimeter direction. The upper frame stoppers are each spaced apart from one another in the perimeter direction, with the respective frame stoppers of the perimeter struts facing one another, for example at the same level with respect to the perimeter direction.

According to some embodiments, two lower first frame stoppers may each be arranged in a lower region of the first perimeter strut with respect to the perimeter direction, and two lower second frame stoppers may each be arranged in a lower region of the second perimeter strut with respect to the perimeter direction. The lower frame stoppers are each arranged at a distance from one another in the perimeter direction and, if appropriate, from the upper frame stoppers. The respective lower frame stoppers of the perimeter struts are located opposite one another, for example at the same level with respect to the perimeter direction. Optionally, a pair of upper and a pair of lower first frame stoppers can thus be provided on the first perimeter strut and a pair of upper and a pair of lower second frame stoppers can be provided on the second perimeter strut. This provides a load application that is uniform and distributed over the door surface.

Generally, door stops may be provided on each of the vertical sides of the door, which, when the door is in the closed state, are arranged at positions corresponding to the position of the frame stops with respect to the perimeter direction.

According to some embodiments, it may be provided that the door frame has a longitudinal strut extending between the first and the second perimeter struts in the longitudinal direction and a stiffening girder which extends at least partially in an arcuate manner between a first junction at which the longitudinal strut is connected to the first perimeter strut and a second junction at which the longitudinal strut is connected to the second perimeter strut. The stiffening girder thus extends outside the door opening totally or partially in an arcuate manner between the first and second longitudinal girders. This provides an additional path for transferring loads acting in the longitudinal direction and in the perimeter direction, thereby providing additional load relief for the door. Furthermore, the rigidity of the frame and thus the form stability of the door opening are improved even after unexpectedly high loads.

According to some embodiments, the stiffener girder may extend beyond each of the first and second junctions and may be connected to the first and second perimeter struts by means of longitudinal connectors. Accordingly, the connection girder may include additional sections extending partially along the perimeter strut and connected to the perimeter struts by longitudinally extending connectors. This further improves the rigidity of the frame.

According to further embodiments, the door may include an inner stiffening structure comprising at least one inner longitudinal strut extending between the door stoppers disposed on opposite sides of the door. The at least one inner longitudinal strut thus extends in the longitudinal direction when the door is in the closed state, facilitating load transmission in the longitudinal direction. At the same time, the mechanical rigidity of the door is improved accordingly.

According to some embodiments, it may be provided that two respective first door stoppers are arranged on a first vertical side of the door, preferably in an upper region with respect to the perimeter direction and/or in the lower region of the first vertical side, wherein two respective second door stoppers are arranged on a second vertical side of the door, preferably in an upper region with respect to the perimeter direction and/or in the lower region of the second vertical side, wherein the inner stiffening structure comprises a first inner longitudinal strut extending between two mutually opposing first and second door stoppers and a second inner longitudinal strut extending between the two further mutually opposing first and second door stoppers, and wherein the inner stiffening structure comprises a first diagonal stiffening strut diagonally extending between a first end portion, located at the first doorstop, of the first inner longitudinal strut and of the second inner longitudinal strut, and a second diagonal stiffening strut diagonally extending between a second end portion, located at the second doorstop, of the first inner longitudinal strut and of the second inner longitudinal strut. For example, a pair of upper first door stoppers and a pair of upper second door stoppers may be provided, wherein a respective inner longitudinal strut extends between each pair of opposing first and second door stoppers. The diagonal stiffening struts each extend from one end of one of the inner longitudinal struts to the other inner longitudinal strut, e.g., to a connection area located near the center of the other respective inner longitudinal strut, such that the first and second diagonal stiffening struts together with the inner longitudinal struts substantially define a trapezoid and two triangles. Preferably, the diagonal stiffening struts extend from an uppermost or lowermost doorstop with respect to the perimeter direction. The described designs of the inner stiffening structure further facilitate the transmission of loads in the perimeter direction.

According to some embodiments, it may be provided that the first and second diagonal stiffening struts each run in an arcuate manner. This realizes a space-saving course of the diagonal stiffening struts, whereby additional structural elements of the door, such as levers, windows or the like, can be accommodated in a simple manner.

According to further embodiments, the first and second diagonal stiffening struts may each extend beyond the second inner longitudinal strut and terminate at a central door perimeter strut. In particular, in the closed state of the door, the central door perimeter strut extends along the perimeter direction, further facilitating the transfer of loads in the perimeter direction. Optionally, an upper and a lower pair of first door stoppers may be provided on the first vertical side of the door, and an upper and a lower pair of second door stoppers may be provided on the second vertical side of the door, respectively, wherein an inner longitudinal strut extends between opposing first door stoppers and the second door stoppers, respectively, which are preferably opposite each other at the same level. Optionally, the door perimeter strut runs between an inner longitudinal strut, which runs between the lower ones of the upper first and second door stoppers with respect to the perimeter direction, and an inner longitudinal strut, which runs between the upper ones of the lower first and second door stoppers with respect to the perimeter direction. Further optionally, upper diagonal stiffening struts extending from upper ones of the upper first and second door stoppers and lower diagonal stiffening struts extending from lower ones of the lower first and second door stoppers are provided.

According to some embodiments, it may be provided that the first abutment portions of the frame stoppers have a first engagement structure which has a greater depth of engagement than the respective first toothing, and wherein the second abutment sections of the door stoppers have a second engagement structure which is formed complementary to the first engagement structure and has a greater depth of engagement than the respective first toothing. In particular, the first engagement structure may be arranged concentrically with respect to the respective first toothing. Likewise, the second engagement structure may be arranged concentrically to the respective second toothing. The engagement structures each have an engagement depth that is greater than the engagement depth of the respective associated toothing. Consequently, the respective engagement structure projects beyond the respective toothing or has a recessed bottom. The complementarily formed first and second engagement structures thus provide an additional load-transmitting element that is still reliably engaged with the respective other engagement structure even when the first and second toothing are only partially engaged with each other. This further improves the reliability of the system. Furthermore, this facilitates centering or a desired alignment of the first and second toothing with respect to each other.

In particular, the first engagement structure may be formed as a recess, preferably as a conical recess, and the second engagement structure may be formed as a protrusion, preferably as a conical protrusion. Alternatively, the first engagement structure can be formed as a protrusion, preferably as a conical protrusion, and the second engagement structure can be formed as a recess, preferably as a conical recess. This further facilitates centering or a desired alignment of the first and second toothings with respect to each other.

According to some embodiments, the first toothing and/or the second toothing may have a plurality of separate, preferably tetrahedron-shaped protrusions. The tooth elements of the toothing can thus be formed as raised, separate protrusions, which can in particular have the shape of a tetrahedron or truncated tetrahedron. This offers the advantage of providing a simple and mechanically stable form of toothing elements.

According to some embodiments of the aircraft, it may be provided that the door system provides access to a passenger area located in the interior of the fuselage. The door thus preferably forms a passenger door.

Generally, the features and advantage disclosed in connection with the door system are also disclosed for the aircraft, and vice versa.

With respect to directional indications and axes, in particular to directional indications and axes relating to the course of physical structures, it is understood herein by a course of an axis, a direction or a structure "along" another axis, direction or structure that these, in particular the tangents resulting in a respective location of the structures, each run at an angle of less than 45 degrees, preferably less than 30 degrees and in particular preferably parallel to one another.

With respect to directional indications and axes, in particular to directional indications and axes relating to the course of physical structures, it is understood herein by a course of an axis, a direction or a structure "transversely" to another axis, direction or structure that these, in particular the tangents resulting in a respective location of the structures, each run at an angle of greater than or equal to 45 degrees, preferably greater than or equal to 60 degrees and in particular preferably perpendicular to one another.

In the following, the invention will be explained with reference to the figures of the drawings. From the figures show.

In the figures, same reference signs denote identical or functionally identical components, unless otherwise indicated.

Figure 1:
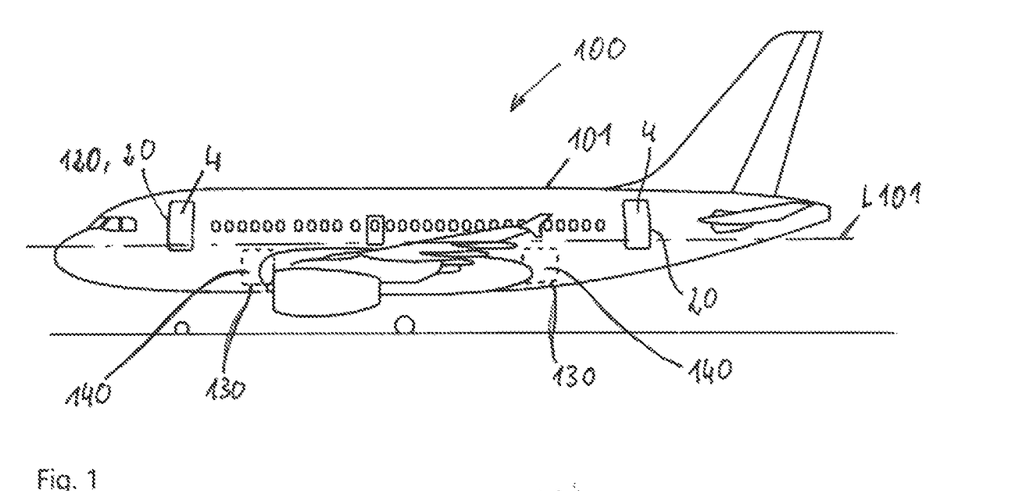
FIG. 1 a schematic view of an aircraft according to an exemplary embodiment of the present invention.

FIG. 1 shows by way of example only an aircraft 100 in the form of an airplane, which has a fuselage 101 extending along a longitudinal fuselage axis L101. The fuselage 101 defines an interior space in which, for example, a passenger cabin, a cockpit and a cargo compartment may be accommodated. As shown schematically in FIG. 1, the fuselage 101 has a door opening 120 which can be closed by a door 4 and allows access to the interior, in particular to the passenger area. The door 4 thus forms a passenger door. Optionally, the fuselage can also have cargo openings 130, which can be closed by cargo doors 140 and allow access to the cargo area. In the exemplary aircraft 100 shown in FIG. 1, two passenger doors 4 are provided, one door 4 being arranged in a front end region of the fuselage 101 and the other door 4 being arranged in a rear end region of the fuselage 101. Of course, only one door 4 may be provided, or additional doors 4 disposed between the front and rear end regions of the fuselage 101 may be provided.

Figure 2:
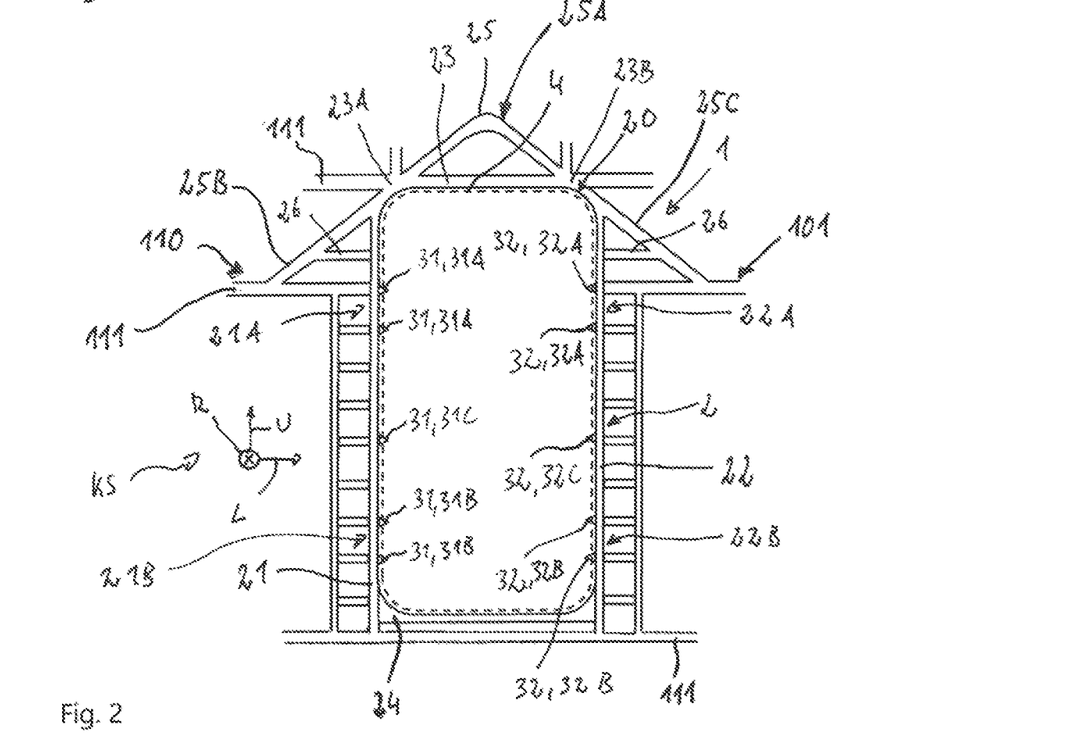
FIG. 2 a schematic view of a door system for an aircraft according to an exemplary embodiment of the invention, wherein the door system is shown in a state installed in the aircraft and a door of the door system is shown in a closed state.

The exemplary aircraft 100 shown in FIG. 1 may have a door system 1, which is schematically shown in FIG. 2. In particular, the door system 1 may have a door frame 2, a door 4, one or more frame-side frame stoppers 31, 32, and one or more door-side door stoppers 51, 52 (not shown in FIG. 2).

In particular, the door frame 2 may be connected to or form part of a support structure 110 of the fuselage 101 of the aircraft 100. In particular, the support structure 110 may have a plurality of stringers 111 extending in a longitudinal direction L extending along the fuselage longitudinal axis L101, the stringers 111 being spaced apart from each other along a perimeter direction U. As shown exemplary in FIG. 2, the door frame 2 may include a first perimeter strut 21 extending in the perimeter direction U and a second perimeter strut 22 extending in the perimeter direction U and arranged spaced apart from the first perimeter strut 21 relative to the longitudinal direction L. Optionally, an upper longitudinal strut 23 extending between an upper region 21A, with respect to the perimeter direction U, of the first perimeter strut 21 and an upper region 22A, with respect to the perimeter direction U, of the second perimeter strut 22 may be provided, which may be formed, for example, by a stringer 111, as exemplarily shown in FIG. 2. Optionally, a lower longitudinal strut 24 extending between a lower region 21B of the first perimeter strut 21 with respect to the perimeter direction U and between a lower region 22B of the second perimeter strut 22 with respect to the perimeter direction U may also be provided. The lower longitudinal strut 24 is shown in FIG. 2 as an example as an independent strut, but can also be formed by a stringer 111. The perimeter struts 21, 22 delimit the door opening 20 with respect to the longitudinal direction L. The optional longitudinal struts 23, 24 delimit the door opening 20 with respect to the perimeter direction U.

As further shown in FIG. 2, the door frame 2 may further comprise an optional stiffening girder 25. As exemplified in FIG. 2, the stiffening girder 25 may have a substantially arcuate or angled portion 25A. The angled portion 25A of the stiffening girder 25 may extend, with respect to the perimeter direction U, in particular outside the door opening 20 or above the optional longitudinal strut 23 between the perimeter struts 21, 22. As can be seen in FIG. 2, the angled portion 25A, which runs generally or at least in sections in an arcuate manner, may extend in particular between a first junction 23A at which the longitudinal strut 23 is connected to the first perimeter strut 21 and a second junction 23B at which the longitudinal strut 23 is connected to the second perimeter strut 22. As further exemplified in FIG. 2, the stiffening girder 25 may also extend beyond the junctions 23A, 23B, for example with respective diagonal sections 25B, 25C. In particular, the diagonal sections 25B, 25C may be implemented as linearly extending sections which extend angled or obliquely relative to the perimeter struts 21, 22. As shown by way of example in FIG. 2, a first diagonal section 25B may run laterally of the first perimeter girder 21 with respect to the longitudinal direction L and may be connected to the first perimeter girder 21 by one or more longitudinal connectors 26. Similarly, a second diagonal section 25C may extend laterally of the second perimeter girder 22 with respect to the longitudinal direction L and be connected to the second perimeter girder 22 via one or more longitudinal connectors 26. Overall, the stiffening girder 25 forms a kind of archway which facilitates the transmission of mechanical loads in the longitudinal direction L through the door frame 2.

As shown schematically by triangles in FIG. 2, one or more frame-side stops or frame stoppers 31, 32 can be attached to each of the perimeter struts 21, 22. In FIG. 2, it is shown by way of example only that two upper first frame stoppers 31A can be arranged in the upper region 21A of the first perimeter strut 21 and two lower first frame stoppers 31B can be arranged in the lower region 21B of the first perimeter strut 21 in each case. An optional first center frame stopper 31C may also be provided between the upper first frame stoppers 31A and the lower first frame stoppers 31B. On the second perimeter strut 22, as exemplified in FIG. 2, two upper second frame stoppers 32A each may be disposed in the upper portion 22A of the second perimeter strut 22, and two lower second frame stoppers 32B each may be disposed in the lower portion 22B of the second perimeter strut 22. Similarly to the first perimeter strut 21, an optional second center frame stopper 32C may also be provided on the second perimeter strut 22. Of course, other arrangements of one or more first frame stoppers 31 on the first perimeter strut 21 and of one or more second frame stoppers 32 on the second perimeter strut 22 are also conceivable. Generally, at least one first frame stopper 31 is attached to the first perimeter strut 21 and at least one second frame stopper 32 is attached to the second perimeter strut 22. As can further be seen in FIG. 2, a respective first frame stopper 31 and a respective second frame stopper 32 can be arranged at the same level with respect to the perimeter direction U, so that they are directly opposite each other in the longitudinal direction L.

Figure 4:
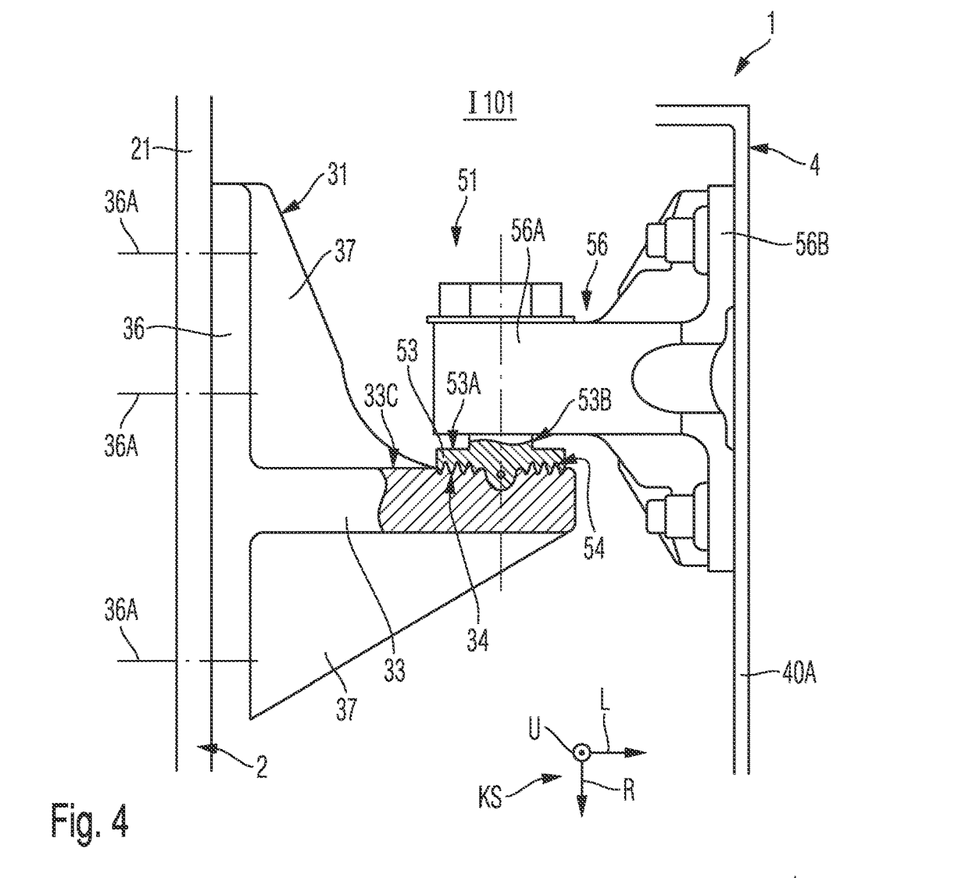
FIG. 4 a detail view of a frame side frame stopper and a door side door stopper in a door system according to an exemplary embodiment of the invention, wherein the door is shown in a closed state.
Figure 5:
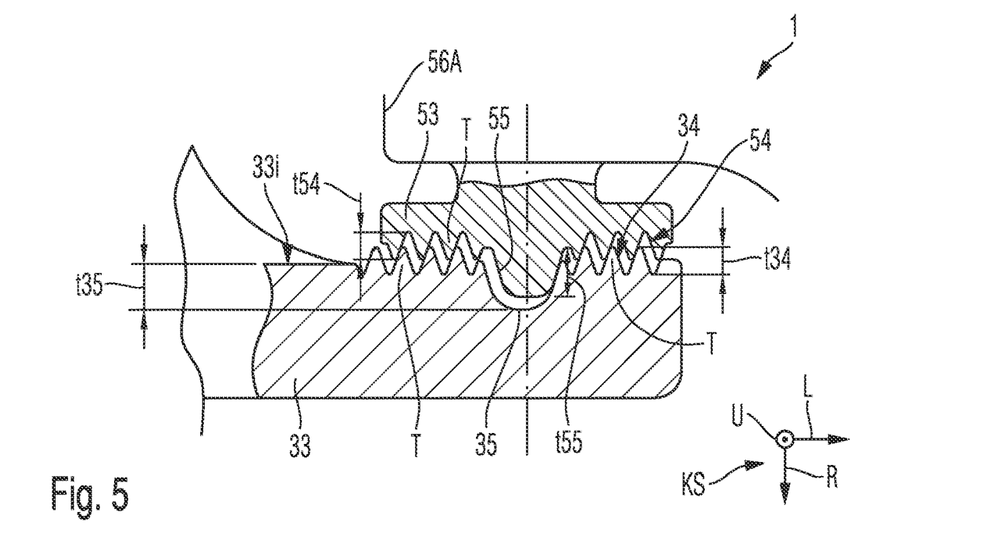
FIG. 5 a detail view of the frame stopper and door stopper shown in FIG. 4, in a partially detached state from each other.

The frame stoppers 31, 32 project into the door opening 20 or project from the respective perimeter girder 21, 22 in the longitudinal direction L. FIGS. 4 and 5 show, by way of example, in detail the structure of a first frame stopper 31. The second frame stoppers 32 are constructed identically, which is why only the structure of a first frame stopper 31 is explained below. As exemplarily shown in FIG. 4, a frame stopper 31 may in particular comprise an abutment portion 33 and a fastening portion 36. The fastening portion 36 and the abutment portion 33 may each be plate-shaped, with the abutment portion 33 extending transversely to the fastening portion 36. For example, abutment portion 33 and fastening portion 36 may define a T-shaped cross-section, as shown in FIG. 4 by way of example. Optionally, additional stiffening ribs 37 may be provided which extend between the fastening portion 36 and the abutment portion 33 of the frame stopper 31. As shown schematically in FIG. 2, fastening portion 36 of frame stopper 31 may be fastened to the perimeter girder 21, for example connected thereto via connecting devices 36A such as screws or rivets.

Figure 6:
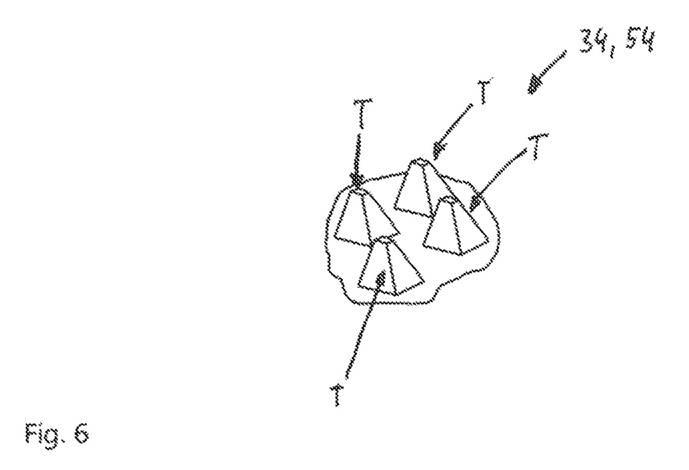
FIG. 6 a schematic detail view of a toothing of a frame stopper or a door stopper of a door system according to an exemplary embodiment of the invention.

As can further be seen in FIG. 4, the abutment portion 33 projecting into the door opening 20 has a first teething 34 on an inner surface 33$i$. The teething 34 may generally comprise a plurality of engagement elements or toothed elements T. As shown by way of example in FIG. 6, the toothed elements T may be implemented, for example, as a plurality of separate projections. In FIG. 6, it is shown by way of example that the projections forming the toothed elements T can be realized in the form of a tetrahedron or in the form of tetrahedral frustums.

As further shown by way of example in FIGS. 4 and 5, the first abutment portion 33 of the frame stopper 31 may optionally comprise a first engagement structure 35, particularly on the inner surface 33$i$. The first engagement structure 35 may be, for example, as shown in FIGS. 4 and 5, realized as an indentation or a recess, which can in particular be of conical design. Alternatively, the first engagement structure 35 may also be implemented as a protrusion. The first engagement structure 35 can, for example, be arranged concentrically or within the first toothing 34, as shown in FIGS. 4 and 5 by way of example only. As further shown in FIG. 5, the first engagement structure can have an engagement depth t35 that is greater than an engagement depth t34 of the toothing 34. In the example of FIG. 5, this means that the recess penetrates deeper into the abutment portion 33 than an area between the individual tooth elements T of the toothing 34.

As can be seen in FIG. 4 by the drawn in coordinate system KS, the frame stopper 31 is fastened to the perimeter girder 21 in such a way that the inner surface 33$i$ of the abutment portion 33 extends perpendicular to a radial direction R running transverse to the longitudinal direction L and transverse to the perimeter direction U. The radial direction R is thus perpendicular to the fuselage longitudinal axis L101. A surface normal to the inner surface 33$i$ thus points in the radial direction R. In particular, the frame stopper is oriented in such a way that the first toothing 34 or the inner surface 33$i$ faces the Interior I101 defined by the fuselage 101, as shown by way of example and purely schematically in FIG. 4.

The optional first and second center frame stoppers 31C, 32C shown by way of example in FIG. 2 may be implemented in the same manner as described above for the other frame stoppers 31. Optionally, it may also be provided that the inner surfaces 33$i$ of the center frame stoppers 31C, 32C are flat, i.e. without first toothing 34 and optionally also without first engagement structure 35.

Figure 3:
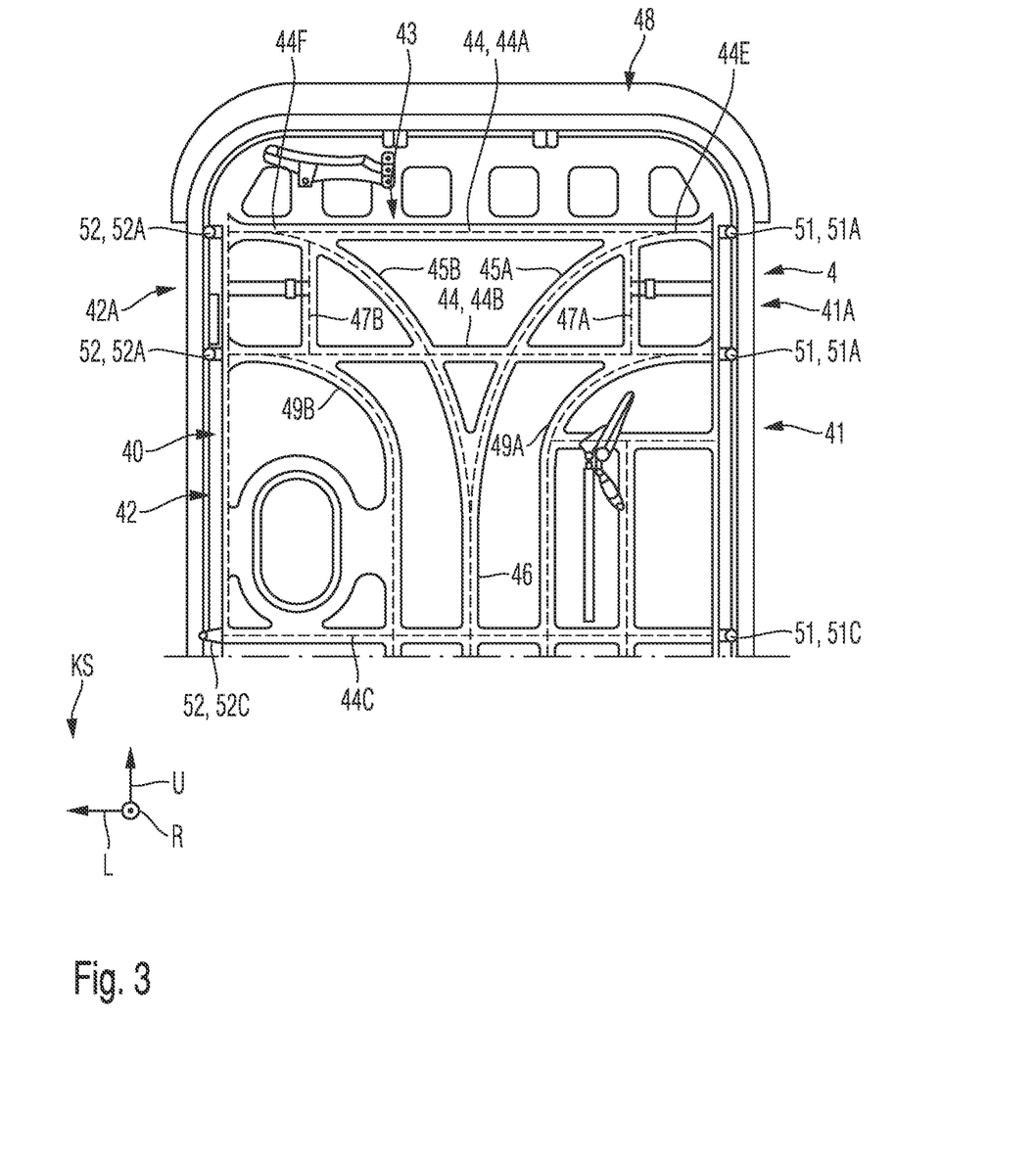
FIG. 3 a door of a door system according to an exemplary embodiment of the invention.

FIG. 3 shows exemplarily and schematically an upper half of a door 4. In FIG. 2, the door 4 is shown only schematically as a dashed line in a closed position. The door 4 generally has a planar extension with a first vertical side 41 and a second vertical side 42 opposite thereto. In general, the door may have a substantially rectangular shape. For example, as further shown schematically in FIG. 3, the door 4 may include an inner frame structure 40 and a panel 48 attached thereto. The door 4 may further include an optional inner stiffening structure 42, which will be described in further detail below.

The door 4 is generally mounted movably relative to the door frame 2, for example, by means of a pivot arm (not shown). For example, the door 4 may be mounted on the support structure 110 of the fuselage 101 of the aircraft 100 surrounding the door frame 2, or generally on a bearing structure that is stationary with respect to the door frame 2. In particular, the door 4 may be movable between a closed position or state in which the door 4 is disposed in the door opening 20 defined by the door frame 2, and an open position or state in which the door 4 at least partially clears the door opening 20. In the closed position of the door, the first vertical side 41 of the door 4 extends along the perimeter direction U and is located facing the first perimeter girder 21 and the second vertical side 42 of the door 4 extends along the perimeter direction U and is located facing the second perimeter girder 22.

As shown by way of example and schematically in FIG. 3, one or more door-side stops or door stoppers 51, 52 may be attached to the door 4. Generally, a number of door stoppers 51, 52 corresponding to the number of frame stoppers 31, 32 are provided on the door 4, wherein the door stoppers 51, 52 are arranged on the door 4 in such a way that, in the closed state of the door 4, one door stopper 51, 52 is located at the same position as one respective frame stopper 31, 32, so that one frame stopper 31, 32 comes into mechanical contact with one respective door stopper 51, 52. Thus, at least one first door stopper 51 arranged at the first vertical side 41 and at least one second door stopper 52 arranged at the second vertical side 42 opposite to the first vertical side 41 are provided at the door 4. As shown in FIG. 3 purely by way of example, two respective upper first door stopper 51A can be arranged on a first vertical side 41 of the door 4, in particular in upper region 41A of the first vertical side 41, which is located in the closed state of the door 4 with respect to the perimeter direction U at the upper region 21A of the first perimeter strut 21. In the same way, two respective lower first door stops (not shown in FIG. 3) can be arranged on the first vertical side 41 of the door 4, in particular in a lower region of the first vertical side 41 which, in the closed state of the door 4, with respect to the perimeter direction U, is located at the lower region 21B of the first perimeter strut 21. Furthermore, two upper second door stoppers 52A each may also be arranged on the second vertical side 42 of the door 4, in particular in an upper region 42A of the second vertical side 42, as shown by way of example in FIG. 3. The upper region 42A of the second vertical side 42 is arranged at the upper region 22A of the second perimeter strut 22 when the door 4 is in the closed state. In the same way, two lower second door stops (not shown in FIG. 3) can be arranged on the second vertical side 42 of the door 4 in each case, in particular in a lower region of the second vertical side 42 which, in the closed state of the door 4 with respect to the perimeter direction U, is located at the lower region 22B of the second perimeter strut 22. As also shown by way of example in FIG. 3, a first center door stopper 51C may optionally be disposed on the first vertical side 41 and a second center door stopper 52C may be disposed opposite thereto on the second vertical side 42 of the door 4. As can further be seen in FIG. 3, a respective first door stopper 51 and a respective second door stopper 52 can be arranged in such a way that they are arranged at the same level in relation to the perimeter direction U when the door 4 is in the closed state.

In FIGS. 4 and 5, a first door stopper 51 is shown in detail by way of example. The second door stoppers 52 are of identical construction, and therefore only one door stopper 51 is described below. As shown by way of example in FIGS. 4 and 5, each door stopper 51 has a second abutment portion 53. The second abutment portion 53 may, for example, comprise a disc- or plate-shaped portion 53A and a bolt 53B extending therefrom, as shown purely exemplarily and merely schematically in FIG. 4. The door stopper 51 may further comprise a connecting portion 56, which comprises a base portion 56A and a fastening portion 56B extending transversely of the base portion 56A, for example in the form of a plate. As shown in FIG. 4 by way of example, the second abutment portion 53 may be connected to the connecting portion 56, for example by the bolt 53B being screwed to the base portion 56A of the connecting portion 56, as shown only schematically in FIG. 4. The base portion 56B of the connecting portion 56 of the door stopper 51 may be connected to the door 4, for example to a part 40A of the inner frame structure 40 of the door 4, for example by being screwed to it, as is schematically shown in FIG. 4.

As further shown in FIGS. 4 and 5, the second abutment portion 53 of the door stopper 51 may comprise a second toothing 54 formed on the abutment portion 53, in particular on the plate-shaped region 53A of the abutment portion 53, which is complementary to the first toothing 34 of the respective frame stopper 32. In particular, the second toothing 54 may generally comprise a plurality of engagement elements or toothed elements T. As shown by way of example in FIG. 6, the toothed elements T may be implemented as a plurality of separate protrusions. In FIG. 6, it is shown by way of example that the protrusions forming the toothed elements T can be realized in the form of a tetrahedron or in the form of tetrahedral frustums. The toothed elements T of the first toothing 34 can engage in the recesses resulting between the projections T.

As further shown by way of example in FIGS. 4 and 5, the second abutment portion 53 of the door stopper 51 may optionally include a second engagement structure 55. The second engagement structure 55 can be realized, for example, as shown in FIGS. 4 and 5, as a projection which can be of conical design, in particular. Alternatively, the second engagement structure 55 may also be realized as a recess. Generally, the second engagement structure 55 is formed complementary to the first engagement structure 35 of the frame stopper 31. For example, the second engagement structure 55 may be arranged concentrically or within the second toothing 54, as shown in FIGS. 4 and 5 by way of example only. As further shown in FIG. 5, the second engagement structure may have an engagement depth t55 that is greater than an engagement depth t54 of the second toothing 54. In the example of FIG. 5, this means that the elevation protrudes beyond the tooth elements T of the second toothing 54.

As already mentioned above, the door stopper 51, 52 are arranged on the door 4 in such a way that, in the closed state of the door 4, they are arranged in positions corresponding to the positions of the frame stoppers 31, 32. In the closed state of the door 4, the first toothing 34 of each frame stopper 31, 32 and the second toothing 54 of each door stopper 51, 52 therefore engage with each other, as shown schematically in FIG. 4. As further shown in FIG. 4, when the door 4 is in the closed state, the first and second engagement structures 35, 55 engage with each other. Due to the toothings 34, 54 provided on the stoppers 31, 51, in the closed state of the door 4, a form-locked join is achieved between the stoppers 31, 51 with respect to the perimeter direction U and the longitudinal direction L. As a result, forces acting in the longitudinal direction L and in the perimeter direction U can be introduced from the door frame 2 into the door 4 and vice versa. Due to the arrangement of the stoppers 31, 51 on opposite sides of the door 4 or the door frame 2, the door 4 can consequently serve as a load-bearing component.

As shown by way of example in FIG. 5, forces acting in the longitudinal direction L and in the perimeter direction U can still be introduced from the door frame 2 into the door 4 and vice versa even if the toothings 34, 54 do not engage with each other with the full engagement depth t34, t54. This effect is further improved by the optional first and second engagement structures 35, 55.

The optional first and second center door stoppers 51C, 52C shown by way of example in FIG. 3 can be implemented in the same way as described above for the other door stoppers 51. Optionally, it can also be provided that the abutment portions 53 of the center door stoppers 51C, 52C are formed flat, i.e. without first toothing 54 and optionally also without second engagement structure 55.

In order to be able to transfer the mechanical forces introduced into the door 4 even better between a first door stopper 51 and a second door stopper 52, the door 4 can have an optional inner stiffening structure 43. As shown purely by way of example in FIG. 3, the inner stiffening structure 43 can, for example, have one or more inner longitudinal struts 44, wherein a respective inner longitudinal strut 44 extends between two mutually opposite first and second door stoppers 51, 52, in particular between first and second door stoppers 51, 52 which are located at the same level in relation to the perimeter direction U in the closed state of the door 4. For example, a first inner longitudinal strut 44A extending between two mutually opposite upper first door stoppers 51A and upper second door stoppers 52A and a second inner longitudinal strut 44B extending between the two further mutually opposite upper first door stoppers 51A and upper second door stoppers 51A, 52A may be provided, as shown by way of example in FIG. 3. The first inner longitudinal strut 44A thereby extends between the two upper ones of the upper first and second door stoppers 51A, 52A and is thus arranged closer to an upper end or side of the door 4 than the second inner longitudinal strut 44B which extends between the two lower ones of the upper first and second door stoppers 51A, 52A. Optionally, a further inner longitudinal strut 44C extending between the center door stoppers 51C, 52C may also be provided.

Optionally, the inner stiffening structure 43 may include a central door perimeter strut 46 disposed centrally between the first and second vertical sides 41, 42 of the door 4 and preferably extending parallel to the vertical sides 41, 42 of the door 4. For example, the central door perimeter strut 46 may be connected to the optional longitudinal strut 44C and terminate spaced apart from the second longitudinal strut 44B. It is also conceivable that the central door perimeter strut 46 terminates at and is connected to the second longitudinal strut 44B.

Also optionally, the interior stiffening structure 43 may include a first diagonal stiffening strut 45A and a second diagonal stiffening strut 45B. In particular, the first diagonal stiffening strut 45A may extend between a first end portion 44E of the first longitudinal inner strut 44A located at the first door stop 51A and the second longitudinal inner strut 44B. As shown by way of example in FIG. 3, in particular the first diagonal stiffening strut 45A may extend from the first end region 44E of the first inner longitudinal strut 44A toward a central region of the second inner longitudinal strut 44B. Optionally, the first diagonal stiffening strut 45A extends beyond the second inner longitudinal strut 44B and may in particular terminate at or be connected to the central door perimeter strut 46, as shown by way of example in FIG. 3. The second diagonal stiffening strut 45B may similarly extend from the second end portion 44F of the first inner longitudinal strut 44A toward the central portion of the second inner longitudinal strut 44B. This results in a diagonal extension of each of the first and second diagonal stiffening struts 45A, 45B between the first and second inner longitudinal struts 44A, 44B. Optionally, the second diagonal stiffening strut 45B may also extend beyond the second inner longitudinal strut 44B and may, in particular, terminate at or be connected to the central door perimeter strut 46, as exemplarily shown in FIG. 3. As further shown by way of example in FIG. 3, the first and second diagonal stiffening struts 45A, 45B may each run in an arcuate or curved manner, wherein the first diagonal stiffening strut 45A extends in a concave curved manner as viewed from the first vertical side 41 of the door 4, and the second diagonal stiffening strut 45B extends in a concave curved manner as viewed from the second vertical side 42 of the door 4.

As further exemplified in FIG. 3, the interior stiffening structure 43 may optionally include lateral door perimeter struts 47A, 47B extending in end regions 44E, 44F between the first and second inner longitudinal struts 44A, 44B. Alternatively or additionally, optional additional diagonal stiffening struts 49A, 49B may further be provided, which extend respectively from the end regions of the second inner longitudinal strut 44B towards the optional further longitudinal strut 44C and are connected thereto. The additional diagonal stiffening struts 49A, 49B can in particular comprise an arcuate or curved course at least in sections, wherein the additional diagonal stiffening struts 49A, 49B can in particular run essentially parallel to the diagonal stiffening struts 45A, 45B and to the central perimeter strut 46, as is shown schematically in FIG. 3.

In FIG. 3, only an upper portion of a door 4 is shown, which, in the closed state of the door 4, is located facing the optional upper longitudinal strut 23 of the frame 2 with respect to the perimeter direction U. In a lower section of the door 4 not shown in FIG. 3, which in the closed state of the door 4 is located facing the optional lower longitudinal strut 24 of the frame 2 with respect to the perimeter direction U, the inner stiffening structure 43 can be implemented in the same way as in the upper section shown in FIG. 4 or as described above. All the struts of the inner stiffening structure 43 may be realized as metal profiles or as profiles made of fiber composite material, such as carbon fiber reinforced plastic. For example, the struts of the inner stiffening structure 43 may have a T-shaped, H-shaped, Ω-shaped or similar cross-section.

The door system 1 described above may be used in an aircraft 100, in particular as a passenger entrance. Due to the toothings 54, 34 provided on the door stoppers 51, 52 and the frame stoppers 31, 32, which engage with one another when in the closed state, a transmission of force between the frame 2 and the door 4 is made possible via a plurality of toothed elements T. Since each individual toothed element T only has to bear a relatively small mechanical load.

Although the present invention has been explained above by way of exemplary embodiments, it is not limited thereto, but can be modified in a variety of ways. In particular, combinations of the preceding exemplary embodiments are conceivable, too.

REFERENCE LIST 1 door system
2 door frame
4 door
20 door opening
21 first perimeter strut
21A upper region of the first perimeter strut
21B lower region of the first perimeter strut
22 second perimeter strut
22A upper region of the second perimeter strut
22B lower region of the second perimeter strut
23 longitudinal strut
23A first junction
23B second junction
25 stiffening girder
25A angled portion of the stiffening girder
25B, C diagonal sections of the stiffening girder
26 longitudinal connectors
31 first frame stopper
31A upper first frame stoppers
31B lower first frame stoppers
31C first center frame stopper
32 second frame stopper
32A upper second frame stoppers
32B lower second frame stoppers
32C second center frame stopper
33 first abutment portion of the frame stoppers
33i inner surface of the first abutment portion
34 first toothing
35 first engagement structure
36 fastening portion
36A connecting devices
40 inner frame structure of door
40A part of the inner frame structure
41 first vertical side of the door
42 second vertical side of the door
43 inner stiffening structure
44 inner longitudinal strut
44A first inner longitudinal strut
44B second inner longitudinal strut
44C further inner longitudinal strut
44E first end portion of first inner longitudinal strut
44F second end portion of first inner longitudinal strut
45A first diagonal stiffening strut
45B second diagonal stiffening strut
46 central door perimeter strut
47A, 47B lateral door perimeter struts
48 panel
49A, 49B additional diagonal stiffening struts
51 first door stopper
51A upper first door stopper
51C first center door stopper
52 second door stopper
52A upper second door stopper
52C second center door stopper
53 second abutment portion
53A plate-shaped portion
53B bolt
54 second toothing
55 second engagement structure
56 connecting portion of door stopper
100 aircraft
101 fuselage
110 support structure
120 door opening
130 Cargo opening
140 Cargo door
I101 Interior
KS Coordinate system
L Longitudinal direction
L101 longitudinal axis of fuselage
R radial direction
t34 engagement depth of the first toothing
t35 engagement depth of the first engagement structure
t54 engagement depth of second toothing
t55 engagement depth of the second engagement structure
U perimeter direction

The invention claimed is:

1. A door system for an aircraft, comprising:
a door frame defining a door opening and having a first perimeter strut extending in a perimeter direction and a second perimeter strut extending in the perimeter direction and arranged spaced apart from the first perimeter strut with respect to a longitudinal direction extending transversely to the perimeter direction;
at least one first frame stopper fixed to the first perimeter strut and at least one second frame stopper fixed to the second perimeter strut, the frame stoppers each comprising a first abutment portion projecting into the door opening and having a first toothing, the first toothing each formed on an inner surface of the first abutment section, the inner surface extending perpendicularly to a radial direction running transversely to the longitudinal direction and transversely to the perimeter direction;
a door mounted moveably relative to the door frame and arranged in in the door opening when in a closed state; and
a number of door stoppers corresponding to the number of frame stoppers, arranged on opposite sides of the door and connected to the door, each door stopper having a second abutment section, wherein the second abutment section comprises a second toothing formed to be complementary to the first toothing, and wherein the first toothing of a respective frame stopper and the second toothing of a respective door stopper engage in one another in the closed state of the door.

2. The door system according to claim 1, wherein the first and second frame stoppers are arranged at the same level with respect to the perimeter direction.

3. The door system according to claim 1, wherein two respective upper first frame stoppers are disposed in an upper portion of the first perimeter strut with respect to the perimeter direction, and wherein two respective upper second frame stoppers are disposed in an upper portion of the second perimeter strut with respect to the perimeter direction.

4. The door system according to claim 1, wherein two respective lower first frame stoppers are arranged in a lower region, with respect to the perimeter direction, of the first perimeter strut, and wherein two respective lower second frame stoppers are arranged in a lower region, with respect to the perimeter direction, of the second perimeter strut.

5. The door system according to claim 1, wherein the door frame comprises a longitudinal strut extending between the first and the second perimeter strut in the longitudinal direction, and a stiffening girder extending at least partially in an arcuate manner between a first junction, at which the longitudinal strut is connected to the first perimeter strut, and a second junction, at which the longitudinal strut is connected to the second perimeter strut.

6. The door system according to claim 5, wherein said stiffening girder extends beyond each of said first and second joints and is connected to said first and second perimeter struts by means of longitudinal connectors.

7. The door system according to claim 1, wherein the door comprises an inner stiffening structure comprising at least one inner longitudinal strut extending between the door stoppers arranged on opposite sides of the door.

8. The door system according to claim 7, wherein two first door stoppers each are arranged on a first vertical side of the door, wherein each two second door stoppers are arranged on a second vertical side of the door, wherein the internal stiffening structure comprises a first inner longitudinal strut extending between two opposing first and second door stoppers and a second inner longitudinal strut extending between the two further opposing first and second door stoppers, and wherein the inner stiffening structure comprises a first diagonal stiffening strut extending diagonally between a first end portion, located at the first door stopper of the first internal stiffening strut, and the second inner stiffening strut and comprising a second diagonal stiffening strut extending diagonally between a second end portion of the first longitudinal inner strut, located at the second door stopper, and the second longitudinal inner strut.

9. The door system of claim 8, wherein the first and second diagonal stiffening struts are each running in an arcuate manner.

10. The door system of claim 8, wherein the first and second diagonal stiffening struts each extend beyond the second longitudinal inner strut and terminate at a central door perimeter strut.

11. The door system according to claim 1, wherein the first abutment sections of the frame stoppers have a first engagement structure having a greater depth of engagement (t35) than the respective first toothing (34), and wherein the second abutment sections of the door stoppers have a second engagement structure, which is formed complementarily to the first engagement structure and which has a greater depth of engagement than the respective first toothing.

12. The door system according to claim 11, wherein the first engagement structure is formed as a conical recess and the second engagement structure is formed as a conical protrusion, or wherein the first engagement structure is formed as a conical protrusion and the second engagement structure is formed as a conical recess.

13. The door system according to claim 1, wherein the first toothing and/or the second toothing comprises a plurality of separate, tetrahedral protrusions.

14. An aircraft, comprising:
a fuselage extending along a longitudinal fuselage axis and defining an interior space; and
a door system according to claim 1;
wherein the door frame of the door system is connected to the fuselage such that the longitudinal direction extends along and the radial direction is perpendicular to the fuselage longitudinal axis.

15. The aircraft of claim 14, wherein the door system provides access to a passenger area located in the interior of the fuselage.

* * * * *